United States Patent Office.

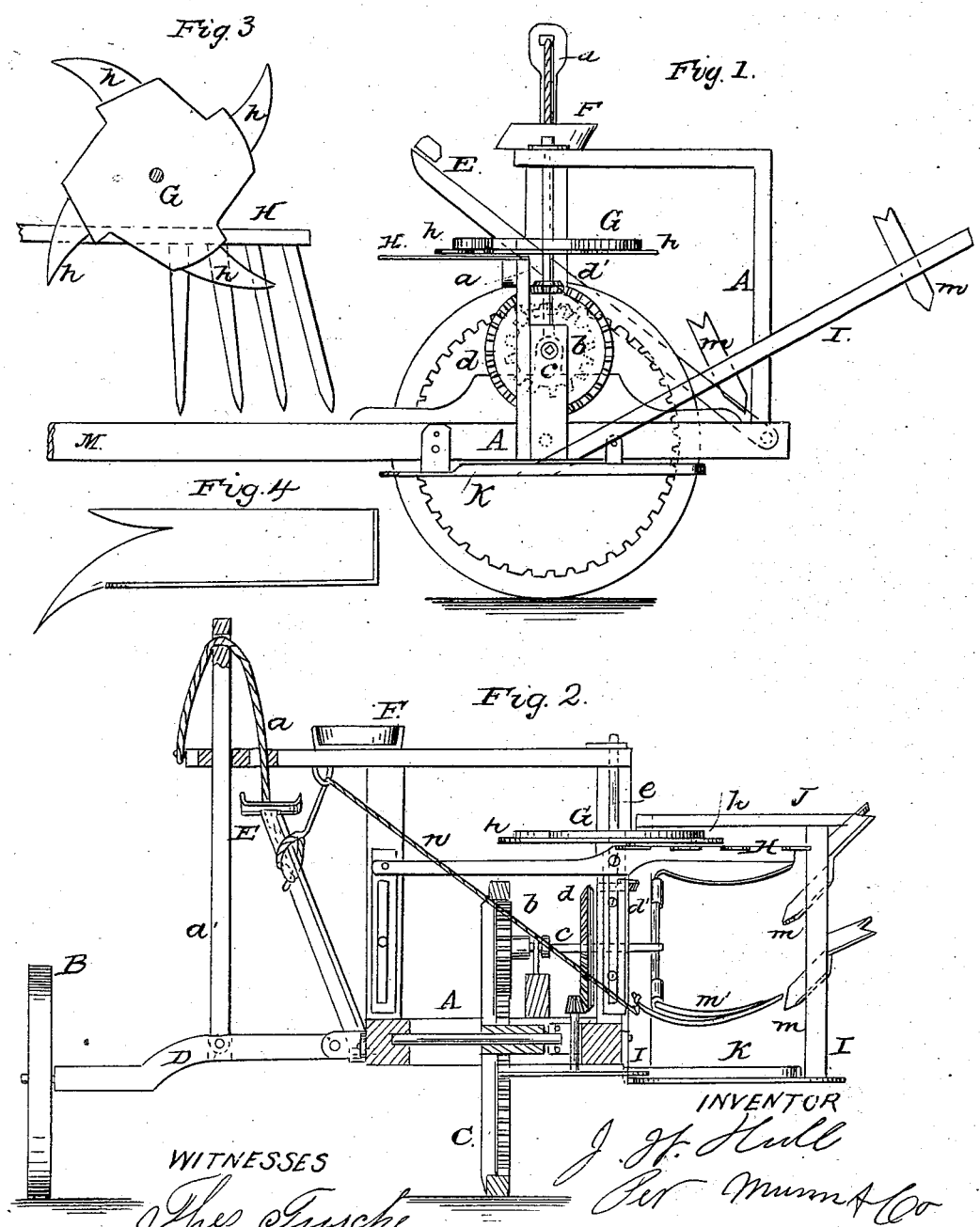

JOHN W. HULL, OF CONNERSVILLE, INDIANA.

Letters Patent No. 72,299, dated December 17, 1867.

---

IMPROVED MACHINE FOR TRIMMING HEDGES AND CUTTING CORN.

---

*The Schedule referred to in these Letters Patent and making part of the same.*

---

TO ALL WHOM IT MAY CONCERN:

Be it known that I, JOHN W. HULL, of Connersville, in the county of Fayette, and State of Indiana, have invented a new and improved Hedge-Trimming and Cornstalk-Cutting Machine; and I do hereby declare that the following is a full, clear, and exact description thereof, which will enable others skilled in the art to make and use the same, reference being had to the accompanying drawings, forming part of this specification.

Figure 1 is a side view of my improved hedge-trimmer and cornstalk-cutter combined.

Figure 2 is a front view of the same, partly in section.

Figure 3 is a detached view of the hedge-cutter.

Figure 4 is a detached view of the corn-cutter.

Similar letters of reference indicate corresponding parts.

This invention relates to a new and useful improvement in the construction of a machine for trimming hedges and cutting down the stalks of corn in the field, and consists of a frame mounted on wheels and drawn by a team, an adjustable rotary cutter being connected with gearing, moved by one of the wheels, for trimming the top and sides of a hedge, and a detachable cutter being placed on the frame, when required, for cutting cornstalks, as the machine travels.

A is a frame, having a draught-pole, M, and mounted on driving-wheels B C, turning on independent axles. The wheel B is hung on a hinged arm, D, that may be raised or lowered, at pleasure, by the driver, to adapt the wheel to the side of a hill, and keep the machine level, by means of a treadle, E, connected with the arm D by a cord, $a$, and rod $a'$, while the driver sits in his seat F. The wheel C has cogs on the inner side of the rim, which gear into a pinion, $b$, on the horizontal shaft $c$, that carries a bevel-wheel, $d'$, on a vertical shaft, $e$. A set of clipping-knives, $h\ h$, are fixed upon the periphery of a disk, G, which is made to fit horizontally on the vertical shaft $e$, for trimming the top of a hedge, by its rotation, when the machine travels, and which may be adjusted, by raising or lowering, to suit the height the hedge needs cutting. The rotating disk G, with the clipping-knives $h\ h$, may also be taken off of the vertical shaft $e$, and placed on the outer end of the horizontal shaft $c$, to trim the side of a hedge. In front of the rotating knives $h\ h$ a forked guide, H, is attached to a frame, A, which guide or guard is also made adjustable, to be raised or lowered with the knives, and be placed in connection either for trimming the top or sides of a hedge.

The operation of these rotating trimming-cutters is obvious.

A cornstalk-cutter is also attached to the frame A, to be used independently of the hedge-cutter, and may be put on and taken off, as required. A frame of two long pieces, I I, and a cross-tie, J, at the rear end, is fastened, in connection with a forked cutter, K, to the lower part of one side of the frame A. The cutter K is made with a sharp-flaring or forked edge of steel in front, which strikes on each side of a row of cornstalks, and cuts them off near the ground, as the machine moves forward. The stalks fall backward over the frame I in such a manner that they can be held up by the driver, to hold the stalks as they fall, by means of a cord, $n$, attached to the treadle E, and can be let down to drop a bundle of stalks when the frame I I is full.

Having thus described my invention, what I claim as new, and desire to secure by Letters Patent, is—

1. The combination of the frame A, the hinged wheel B, the cog-driving wheel C, connected with gearing to move the horizontal shaft $c$, and the vertical shaft $e$, the rotating disk G, with the hedge-cutting knives $h\ h$, the forked guide H, and the treadle E, arranged and operating substantially as and for the purpose herein described.

2. The combination of the main frame A, the side frame I I, the forked cornstalk-cutter K, the fixed arms $m\ m$, the pivoted arms $m'\ m'$, and the treadle E, arranged and operating as and for the purpose herein set forth.

JOHN W. HULL.

Witnesses:
T. N. SHERWOOD,
J. A. HANSON.